United States Patent [19]
Wilson

[11] Patent Number: 5,742,680
[45] Date of Patent: Apr. 21, 1998

[54] SET TOP BOX FOR RECEIVING AND DECRYPTION AND DESCRAMBLING A PLURALITY OF SATELLITE TELEVISION SIGNALS

[75] Inventor: Jerrell Wilson, Los Gatos, Calif.

[73] Assignee: E Star, Inc., Los Gatos, Calif.

[21] Appl. No.: 556,511

[22] Filed: Nov. 13, 1995

[51] Int. Cl.$^6$ .................................................. H04L 9/32
[52] U.S. Cl. ................................. 380/16; 380/20; 380/47
[58] Field of Search ...................................... 380/16, 20, 47; 343/753

[56] References Cited

U.S. PATENT DOCUMENTS

| | | | |
|---|---|---|---|
| 3,890,461 | 6/1975 | Vogelman et al. | 380/16 |
| 4,471,379 | 9/1984 | Stephens | 380/16 |
| 4,663,664 | 5/1987 | Ragan et al. | 380/16 |
| 4,796,032 | 1/1989 | Sakurai et al. | |
| 4,866,787 | 9/1989 | Olesen. | |
| 4,908,834 | 3/1990 | Wiedemer | 380/16 |
| 4,993,066 | 2/1991 | Jenkins | 380/16 |
| 5,073,930 | 12/1991 | Green et al. | 380/10 |
| 5,134,486 | 7/1992 | Suzuki et al. | |
| 5,134,656 | 7/1992 | Kudelski | 380/16 |
| 5,204,512 | 4/1993 | Ieki et al. | 380/16 |
| 5,208,856 | 5/1993 | Leduc et al. | 380/16 |
| 5,237,610 | 8/1993 | Gammie et al. | 390/16 |
| 5,272,753 | 12/1993 | Nakayama et al. | |
| 5,282,249 | 1/1994 | Cohen et al. | 380/23 |
| 5,325,431 | 6/1994 | Naruse | 380/46 |
| 5,367,571 | 11/1994 | Bowen et al. | 380/20 |
| 5,426,701 | 6/1995 | Herrmann et al. | 380/16 |
| 5,495,258 | 2/1996 | Mohlhauser et al. | 343/753 |

*Primary Examiner*—Salvatore Cangialosi
*Attorney, Agent, or Firm*—Myers Liniak & Berenato

[57] ABSTRACT

A system and corresponding method are provided for selecting one of a plurality of simultaneously received encrypted direct broadcast satellite (DBS) signals for decryption and viewing. A converter box or decrypting device is provided with a plurality of different decrypting smart cards, all of which are simultaneously inserted in the converter box. The user or viewer scans the received signals and selects one for viewing. The different decrypting algorithms of the different smart cards respectively correspond to the different encryptions of the received DBS signals so that the selected encrypted signal is decrypted by the appropriate and corresponding decrypting smart card and subsequently decompressed and viewed.

14 Claims, 13 Drawing Sheets

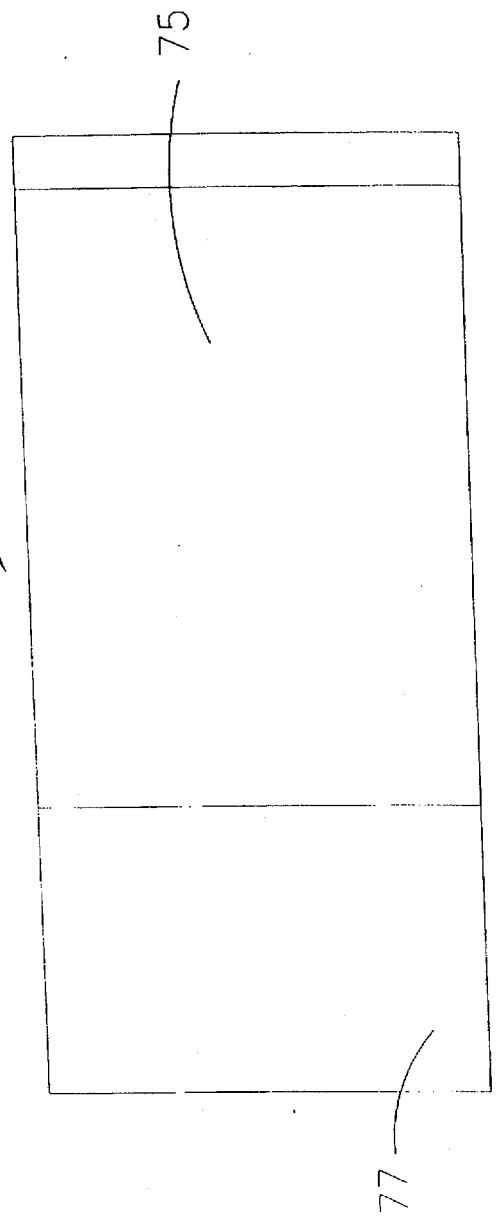
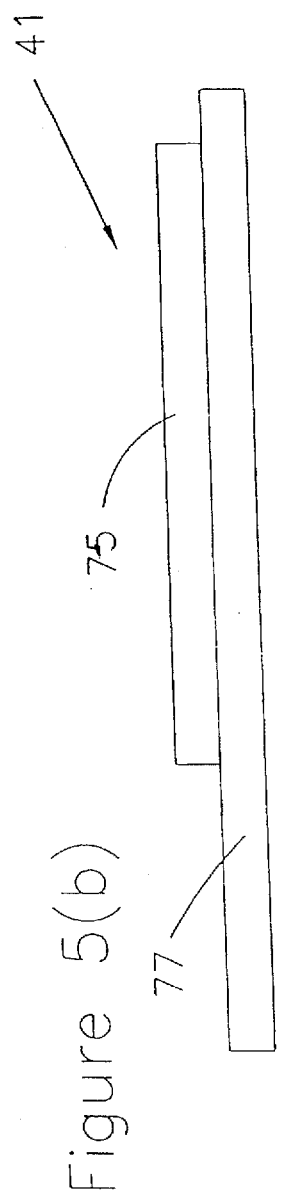
Figure 5(a)
Figure 5(b)

SET TOP BOX FOR RECEIVING AND DECRYPTION AND DESCRAMBLING A PLURALITY OF SATELLITE TELEVISION SIGNALS

This invention relates to a system and corresponding method for receiving a plurality of differently encrypted signals, selecting one of the signals, and decrypting the selected signal for subsequent viewing. More particularly, this invention relates to a system including a decrypting device capable of simultaneously housing a plurality of removable decrypting smart cards, each card storing a different decrypting algorithm, so that a user or viewer can scan received signals from different satellites, select one for viewing, and have the selected signal decrypted using the appropriate card and thereafter shown.

RELATED APPLICATIONS

This application relates to commonly owned U.S. Ser. No. 08/299,376 filed Sep. 1, 1994 entitled "MULTIPLE BEAM ANTENNA SYSTEM FOR SIMULTANEOUSLY RECEIVING MULTIPLE SATELLITE SIGNALS", now U.S. Pat. No. 5,495,258. The '376 application is related to a multibeam array antenna system for simultaneously receiving a plurality of satellite signals and forwarding same to a viewer.

This application is also related to commonly owned U.S. Ser. No. 08/519,282 filed Aug. 25, 1995 entitled "MULTIPLE BEAM ANTENNA SYSTEM FOR SIMULTANEOUSLY RECEIVING MULTIPLE SATELLITE SIGNALS", now pending, this application being a continuation-in-part of the '376 application. Both of these applications are hereby incorporated herein by reference.

BACKGROUND OF THE INVENTION

The use of geosynchronous satellites to distribute television signals is known in the broadcasting industry and has helped revolutionize television distribution systems. As is known, there are many communications satellites encircling the earth occupying so-called "geosynchronous orbits" meaning that the satellites appear to be stationary relative to fixed points on earth. These satellites receive television signals originating from earth ("uplink" signals) and retransmit the signals back to earth (retransmitted signals are called "downlink" signals). While such satellites typically employ directional antennas to transmit downlink signals, the high altitude of the satellites enables a large portion of the earth to receive the downlink signals. Thus, a single satellite can distribute television signals to entire continents or large portions of continents, and receiving antennas on such continents are capable of receiving signals from a plurality of such satellites.

Home television users or viewers obtain such satellite signals via either a satellite receiving antenna/system located at the user's residence or alternatively by way of a cable distribution network including a cable headend. In rural and remote areas where cable is unavailable or even undesirable, viewers often utilize their own satellite receiving station/converting station for receiving satellite television transmissions from the above-identified direct broadcast satellites (DBS). Such stations typically include a satellite receiving parabolic antenna or dish and associated motor-controlled positioning mount, as well as a low noise amplifier (LNA) located at the antenna for amplifying weak signals, a LNA block converter stage for down-converting the block of transponders or channels received, a conventional satellite receiver which performs channel selection and frequency/mode conversion, and a standard television/video monitor.

Typically, a satellite broadcast signal in a frequency range of about 12 GHz is received by a DBS antenna such as a parabolic antenna erected outside of the viewer's home. The satellite broadcast signal is converted into a BS-IF signal in a frequency range from about 950 to 1,450 MHz and is subsequently supplied to a tuner. At the tuner, the desired satellite broadcast channel is selected from the BS-IF signal and demodulated into video and audio which are then supplied to the television set.

For example, U.S. Pat. No. 4,796,032 discloses a satellite broadcasting receiving system including a parabolic antenna, antenna control system for directing the antenna, signal processing section, and video/audio display system. A parabolic antenna receives the television waves from the satellite towards which it is directed and forwards to the received signal to a signal processing section which transforms the signal into one which can be used by the video/audio display. Unfortunately, the user/viewer of the signal received by the system of the '032 patent is limited to viewing signals sent by the particular satellite at which the parabolic antenna is directed. If the user/viewer wishes to view signals from another satellite, the user must actuate the antenna control section motor which repositions the parabolic antenna to receive such signals. This is a time consuming and burdensome routine which must be gone through each time the viewer wishes to change satellites.

U.S. Pat. No. 4,993,006 discloses a system for receiving a scrambled satellite television signal and unscrambling same for subsequent output. The unscrambling circuit in the system includes a user exchangeable plastic card which contains an electronic circuit which provides the key for a corresponding unscrambling circuit. By removing one card and replacing it with another, the decoding characteristics of the reception circuit can be changed. Unfortunately, the reception circuitry of the '066 patent can only receive one descrambling card at a time, and the user/viewer is limited to viewing scrambled signals which can be descrambled by that card.

U.S. Pat. No. 5,426,701 discloses a cable television converter box with a smart card connector attached thereto, the smart card storing a predetermined signal security decrypting algorithm. Unfortunately, this system, as those discussed above, is only capable of decrypting one type of signal encryption, thereby limiting the user/viewer to viewing signals capable of being decrypted with that particular smart card (e.g. signals only from one satellite).

U.S. Pat. No. 4,663,664 discloses an electronic ticket method and apparatus for television signal scrambling and descrambling, wherein an electronic ticket for descrambling transmitted video is simply plugged into a descrambler unit associated with a video display. The system of this patent suffers from the same problems discussed above with respect to the previously described prior art patents.

U.S. Pat. No. 5,073,930 discloses a cable headend method and system for receiving and distributing satellite transmitted television signals, typically operating in the satellite block frequency range of about 950–1,450 MHz. This patent is directed toward a cable headend system with optimum selection of transponders from one or more satellites and with both vertical and horizontal polarities. The received signals may be distributed to multiple subscribers in apartment complexes, condominiums, and subdivisions. Unfortunately, the system/method of the '930 patent is related to a cable headend, not to a system which can be set up at a user's/viewer's residence. Also, the user is limited to viewing those signals which are received by the headend. Furthermore, the system/method of the '930 patent is not provided with interchangeable decryption cards.

Accordingly, there exists a need in the art for a system/method for allowing a user at the user's residence to simultaneously receive a plurality of differently encrypted or scrambled satellite television broadcast signals from different satellites, choose a particular signal for viewing, and decrypt the selected signal for subsequent viewing. There also exists a need in the art in such a system for a converter box provided with a plurality of different simultaneously received removable decrypting cards which allow the user to decrypt signals differently encrypted signals from multiple satellites (each satellite, for example, using a different encryption technique or algorithm), and interchange the removable cards with different decryption cards at the user's desire.

It is a purpose of this invention to fulfill the above-described needs, as well as other needs apparent to the skilled artisan from the following detailed description of this invention.

SUMMARY OF THE INVENTION

This invention will now be described with reference to certain embodiments thereof as illustrated in the following drawings.

IN THE DRAWINGS

Figure 1:
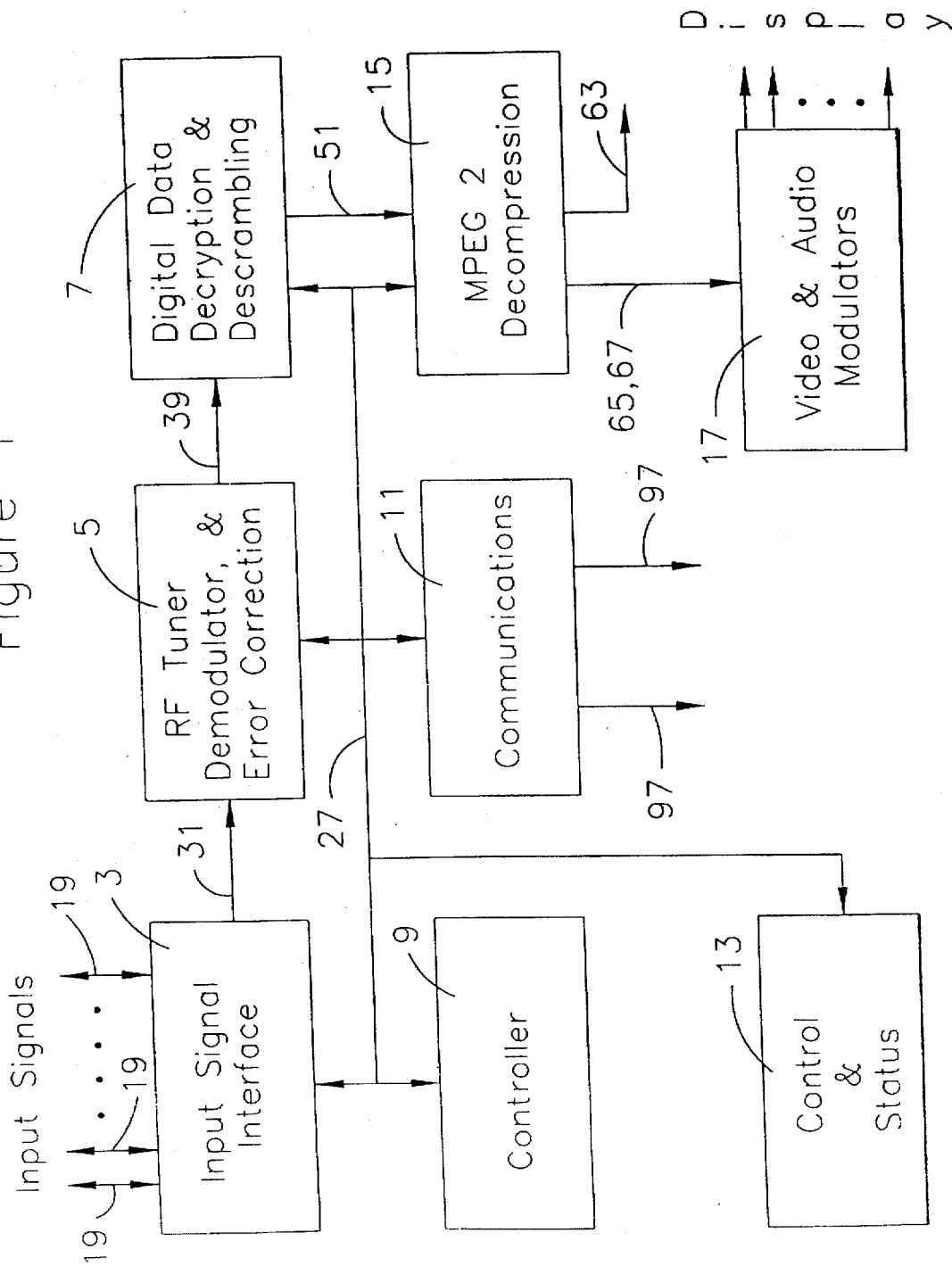
FIG. 1 is a block diagram of certain components making up the system/method according to an embodiment of this invention.
Figure 4:
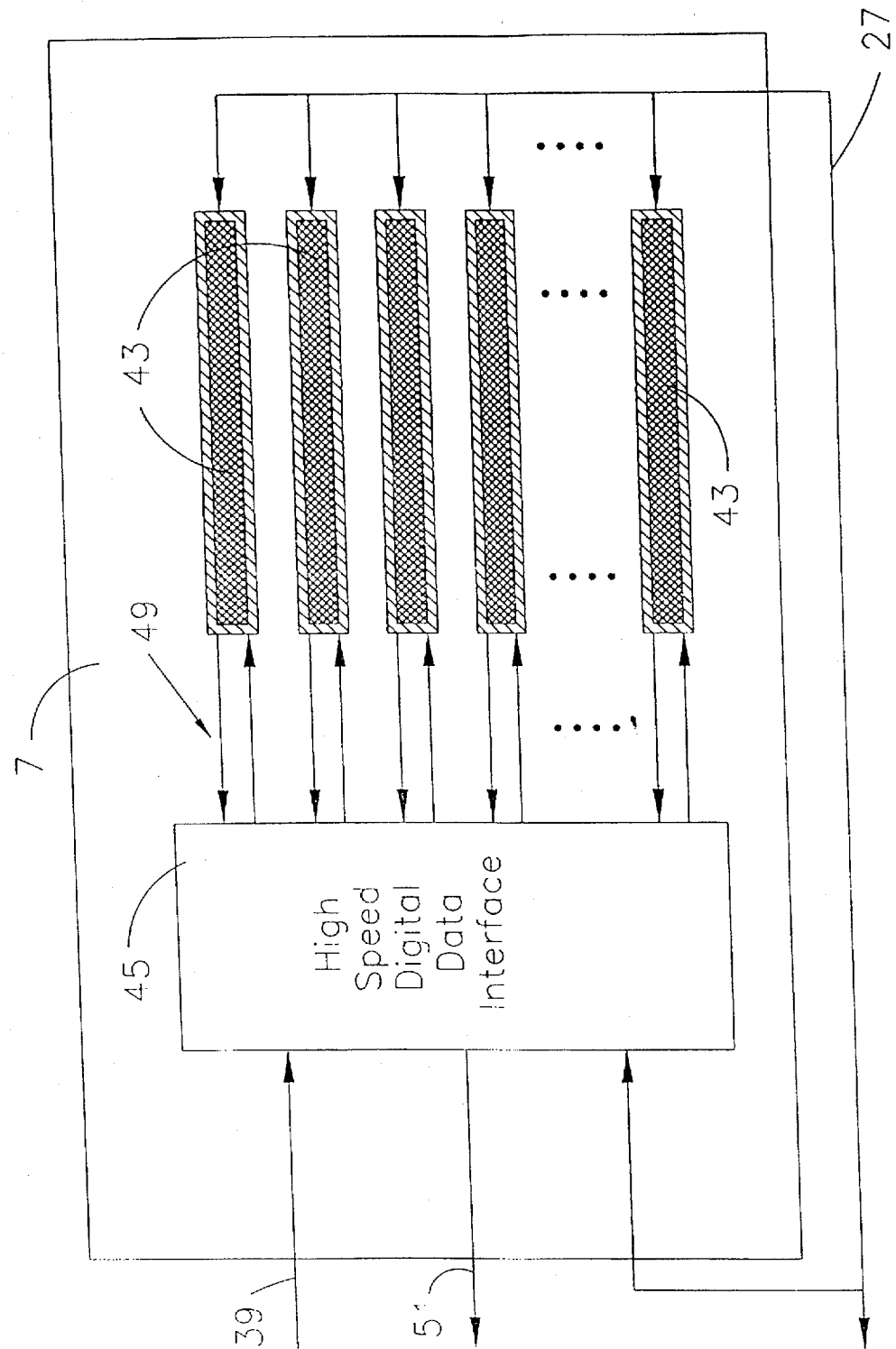
FIG. 4 is a block diagram of the digital data decryption and descrambling block of FIG. 1.

FIGS. 5(a) and 5(b) are top elevational and side elevational views of one of the decrypting smart cards to be inserted into the decrypting/descrambling block of FIGS. 1 and 4.

Figure 6:
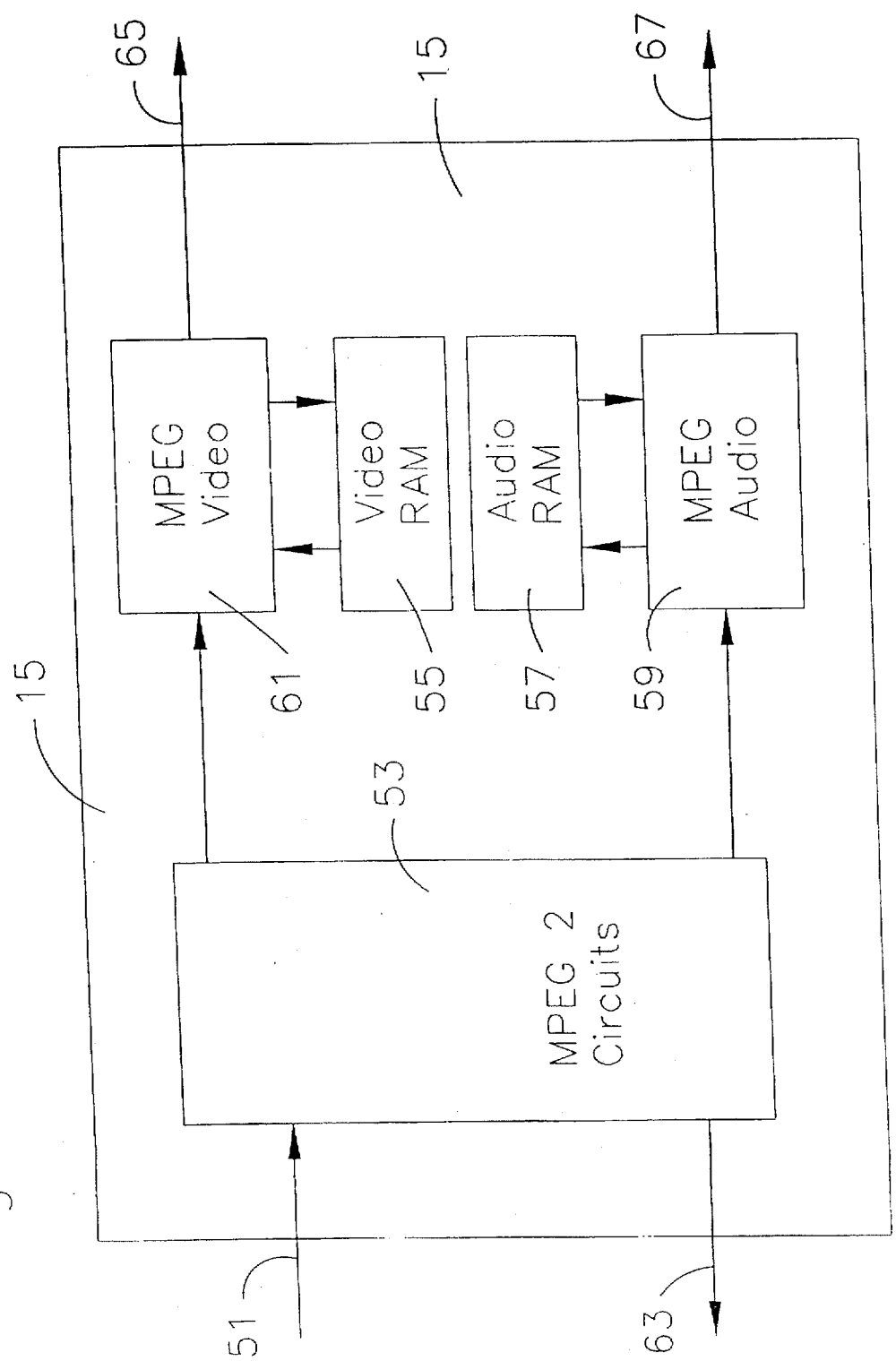

FIG. 6 is a block diagram of the decompression block of FIG. 1.

Figure 7:
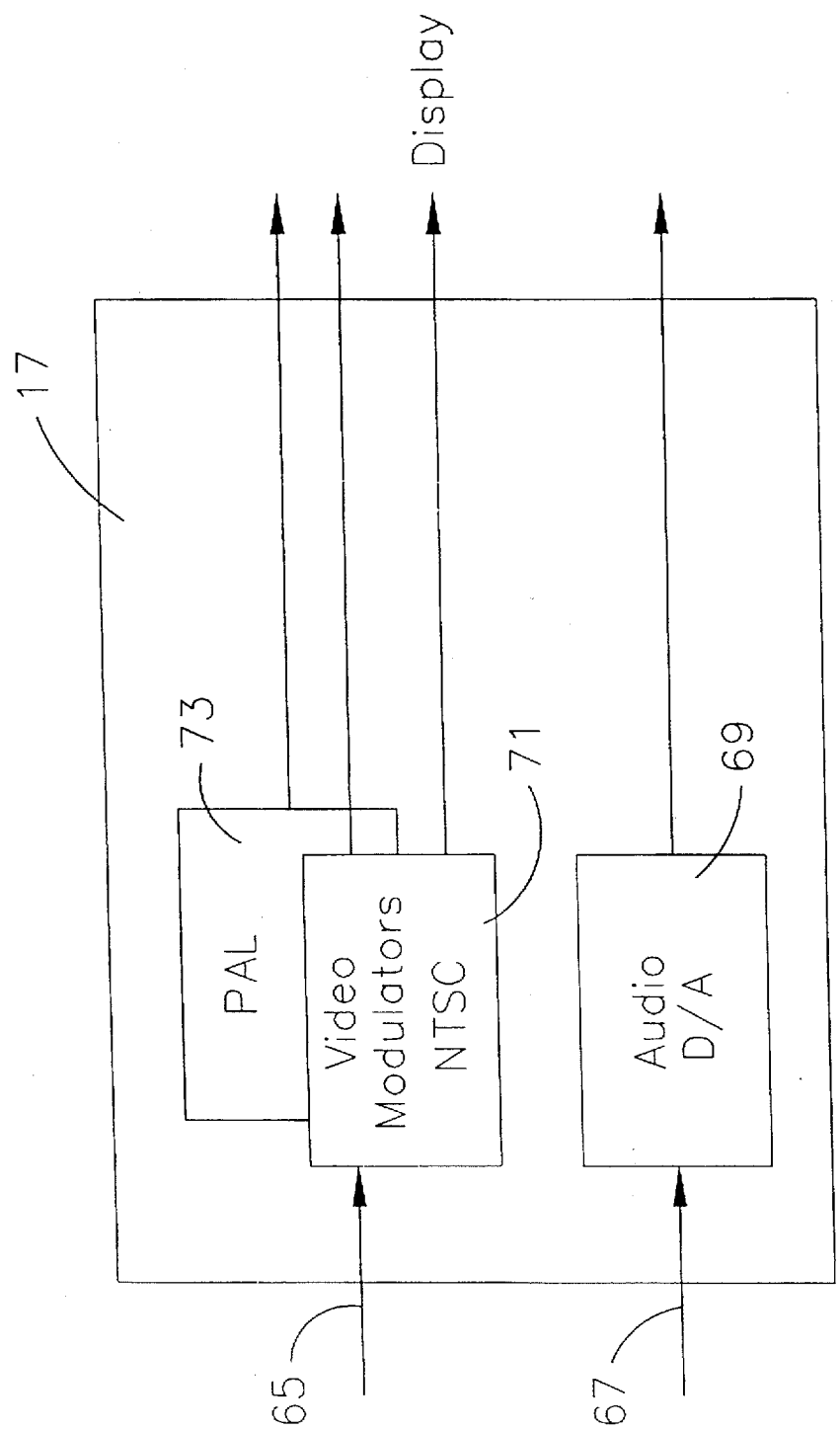

FIG. 7 is a block diagram of the video and audio modulators of FIG. 1.

Figure 8:
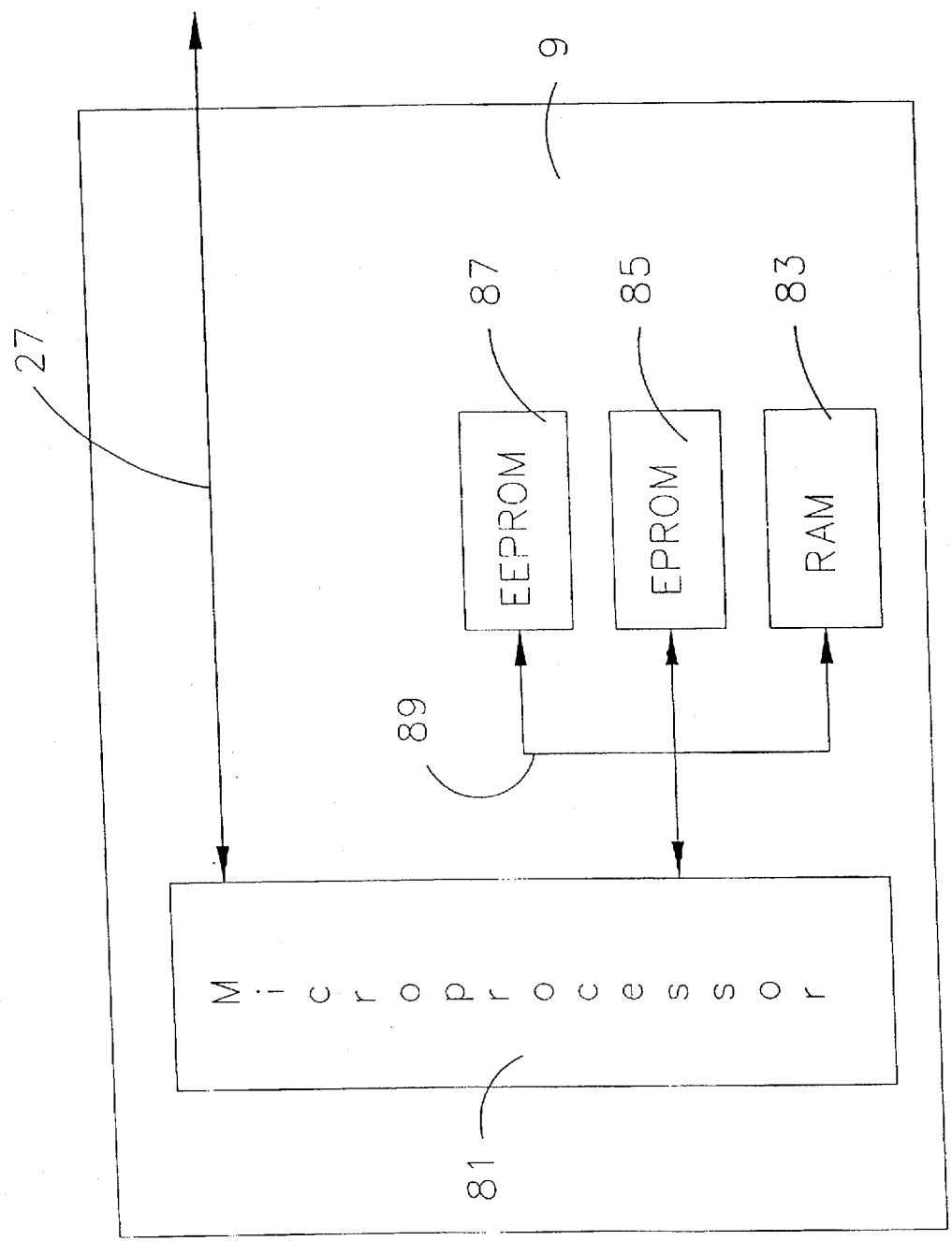

FIG. 8 is a block diagram of the controller of FIG. 1.

Figure 9:
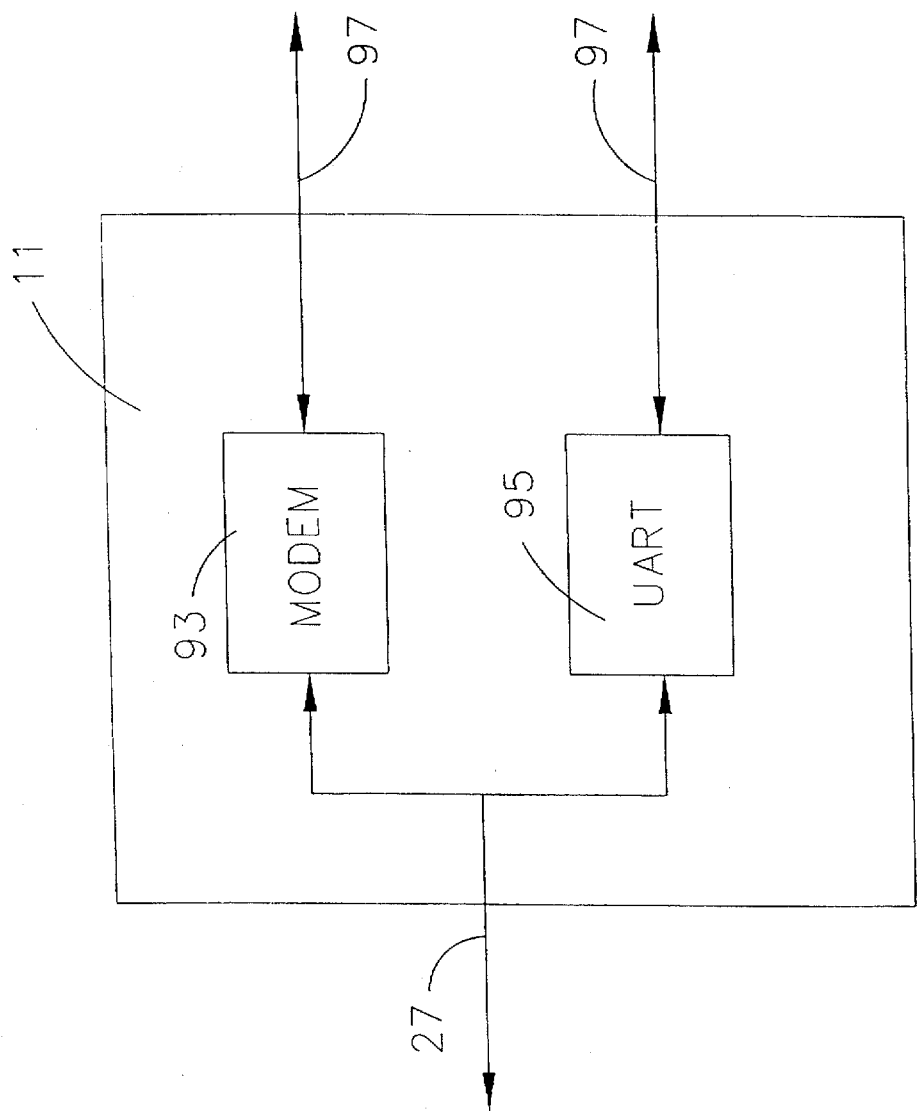

FIG. 9 is a block diagram of the communications block of FIG. 1.

Figure 10:
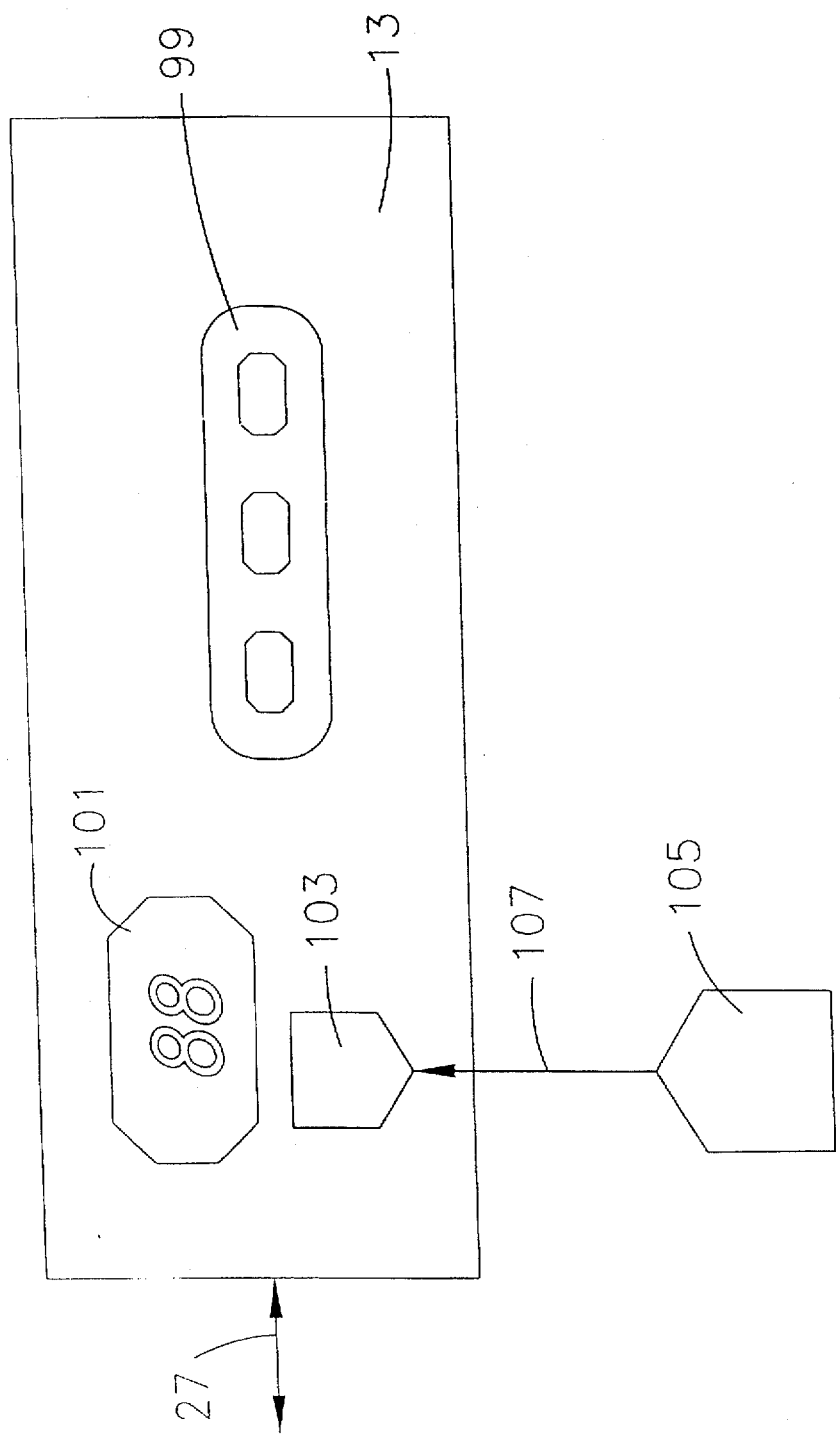

FIG. 10 is a side elevational view, including remote control, of the control and status device of FIG. 1.

FIGS. 11-15 are exploded perspective views of a multi-beam array antenna which is in communication with the input signal interface of FIG. 1 according to certain embodiments of this invention, this antenna simultaneously receiving a plurality of differently encrypted signals from different satellites.

DETAILED DESCRIPTION OF CERTAIN EMBODIMENTS OF THIS INVENTION

Referring now more particularly to the accompanying drawings in which like reference numerals indicate like parts throughout the several views.

FIG. 1 is a block diagram of a satellite television receiving system for receiving, selecting, decrypting, and descrambling signals transmitted from a plurality of different satellites 18 according to an embodiment of this invention. The system includes input signal interface 3, radio frequency (RF) tuner, demodulator, and forward error correction system 5, digital data decrypting and descrambling device 7, controller 9, communications block 11, control and status device 13 including a remote control 105, MPEG 2 decompression system 15, and video and audio modulators 17. The above-listed components are made up of hardware in certain embodiments, but may be made up of software according to certain alternative embodiments.

Figure 2:
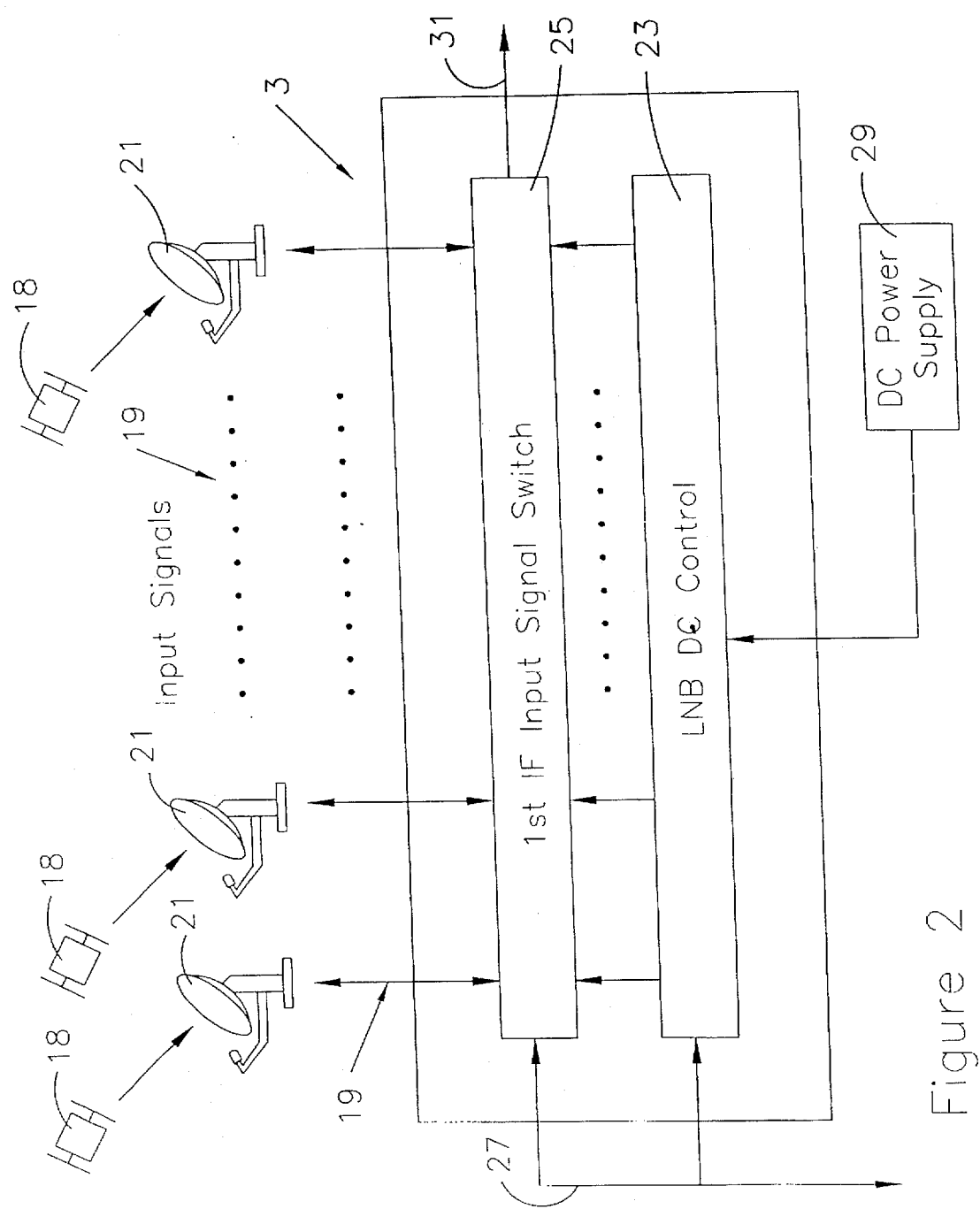
FIG. 2 is a block diagram illustrating a parabolic antenna system including a plurality of antennas in combination with the input signal interface of FIG. 1.

Referring now to FIGS. 1-2, signals 19 input to input signal interface 3 are a plurality of digitally modulated radio frequency (RF) carriers forwarded from antenna system 21. Antenna system 21 may either be a plurality of parabolic antennas (see FIG. 2) or a multibeam array antenna (see FIG. 11), both of which are designed to simultaneously receive a plurality of different signals from different satellites 18, each satellite using different encryption in many instances. For example, a multibeam array antenna system 21 (see FIG. 11) may simultaneously receive right-hand circularly polarized, left-hand circularly polarized, and linearly polarized downlink signals from first, second, and third satellites 18 respectively, each having different encryption.

Signals 19 output from antenna system 21 are at a first intermediate frequency (IF) from a plurality of low noise block down converters (LNBs) located within antenna system 21. The multibeam array antenna or parabolic antennas of system 21 is/are directed toward a plurality of direct-to-home (DTH) direct broadcast satellites (DBS) or any other conventional satellite. LNB DC control 23 and first intermediate frequency (IF) input signal switch 25 are included in input signal interface 3, with switch 25 functioning to select (in accordance with instructions) one of the plurality of IF signals received from antenna system 21 for subsequent forwarding to the decrypting and descrambling system. Switch 25 is controlled by way of bus 27 via controller 9 and control and status station 13 so that the user may scan through the received DBS signals using remote control 105 together with the user's television (or display screen) and select the desired one for viewing.

DC power supply 29 functions to power the LNB DC control 23 which in turn allows IF input switch 25 to be operated. The selected IF signal 31 received from antenna system 21 is forwarded from input signal interface 3 to block 5 for conventional radio frequency (RF) tuning, demodulation, and forward error correction (FEC).

Figure 3:
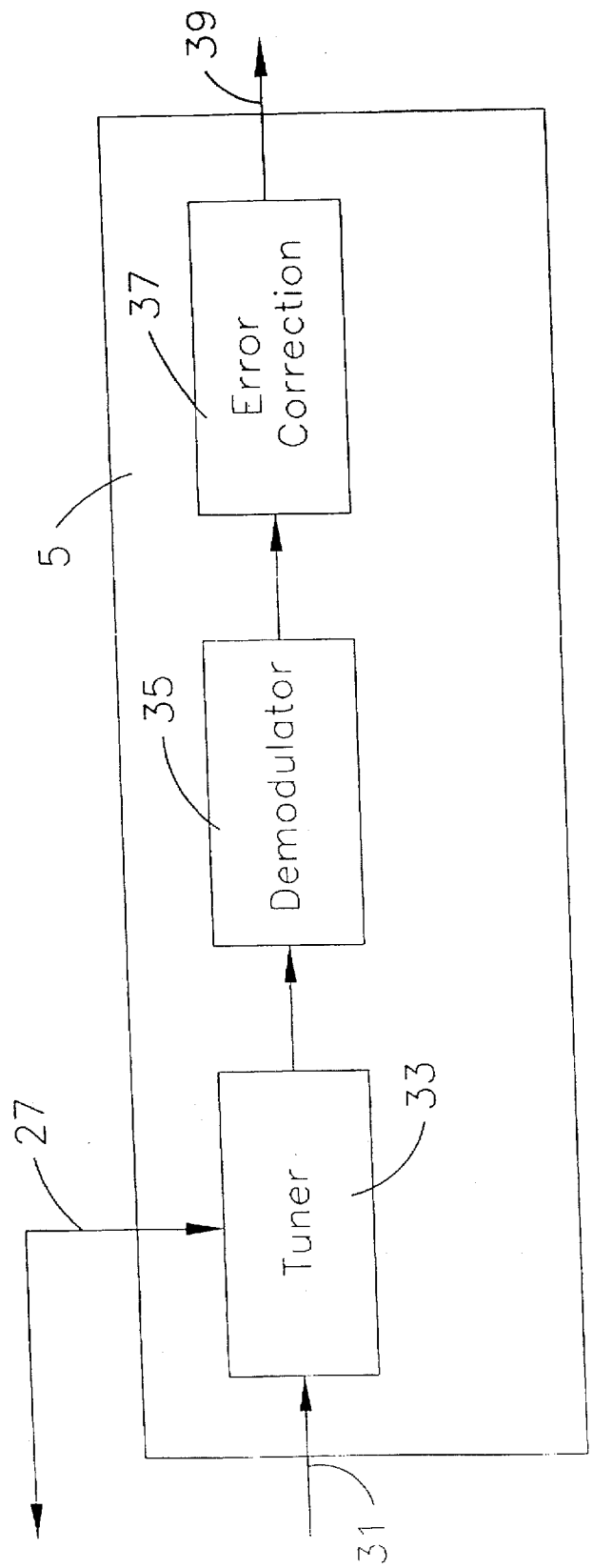
FIG. 3 is a block diagram of the RF tuner, demodulator, and error correction block of FIG. 1.

As shown in FIG. 3, output 31 of input signal interface 3 reaches block 5 and first enters RF tuner 33. Tuner 33 is of conventional nature and functions to forward the selected satellite broadcast channel from the IF signal to demodulator 35. Tuner 33 is instructed by way of bus 27 as to which channel has been selected by the user/viewer via remote control 105, for example, at station 13. The output of tuner 33 is forwarded to demodulator 35 which samples the signal to demodulate therefrom in a known manner. Any type of conventional and compatible modulation and demodulation may be used.

The output of demodulator 35 is forwarded to forward error correction (FEC) device 37, which is conventional in nature. FEC device 37 employs the adding of systematic redundancy at the transmit end of the communication length such that errors caused by the transmission medium can be corrected by way of a known decoding algorithm. Any conventional type of known FEC may be utilized. After being forward error corrected, data and clock output 39 of block 5 is forwarded to decrypting and descrambling station 7.

Decrypting and descrambling station 7 receives output 39 from FEC device 37, this output being a high speed digital stream which is subsequently decrypted and descrambled in block 7. Decryption, the inverse of encryption, is the process whereby information is recovered from the publicly transmitted satellite downlink signal formatted digitally through the use of an encryption algorithm, and a selected key, from a set of possible keys appropriate for the particular encryption algorithm. In such a manner, confidential information controlling the descrambling process can be passed or transmitted by way of open channels provided that security is maintained for the specifics of the encryption algorithm and keys. Encryption systems can be made robust to an arbitrarily high level of security through increasing cleverness and complexity. Descrambling, on the other hand, is the process used to render the video image useless to an unauthorized viewer. This may be accomplished in many conventional ways within the transmission and reconstruction of video information.

In block 7, descrambling of the signal is a continuous process performed upon the video data frames received from FEC 37 that restores original images, this descrambling process being under the functional control of information which may be resident within smart cards 41 (in certain embodiments) removably placed within receptacles or storage slots 43.

The encryption (and decryption) key and algorithm information stored within smart cards 41 may be periodically updatable through the transmitted encrypted data channel. Both the scrambled video data channels and the encrypted data channel are contained within the satellite transmitted MPEG transport layer data stream of the transmitted signal according to certain embodiments. Decryption functions reside within smart cards 41 while descrambling functional elements may reside within smart cards 41 and/or external elements.

Block 7 includes high speed digital data interface 45 and a plurality of smart card receptacles 43 coupled by way of communication links/interfares 49, each receptacle 43 being conventional in nature and adapted to removably receive a single smart card 41 so that a plurality of different decryption descrambling algorithms may be stored within block 7, each card 41 storing a different such algorithm appropriate for use in decrypting descrambling a particularly encrypted scrambled signal transmitted by way of satellite downlink.

The channel selected for viewing in block 5 is interfaced with the appropriate decrypting descrambling smart card by way of high speed digital data interface 45 so that the encryption scrambling technique of the selected signal corresponds to the decryption descrambling algorithm and/or key stored on the accessed smart card 41. In such a manner, the correct decryption descrambling algorithm can be applied to the encrypted scrambled selected signal. The smart card 41 stored in each receptacle 43 in block 7 stores a different decryption algorithm so that the number of stored decrypting descrambling algorithms in block 7 is a function of the number of receptacles 43. For example, if three receptacles 43 are provided, then three different decrypting descrambling algorithms may be stored and accessed within block 7 by way of three smart cards 41 in view of the fact that each receptacle 43 removably receives a single smart card 41.

After the selected signal and channel has been matched with the appropriate decrypting algorithm by way of interface 45, block 7 functions to decrypt and descramble the selected data in a known manner. Interface 45 and receptacles 43 are controlled by way of control and status data bus 27. Interface 45 includes a switch and interfacing circuits to control the distribution of digital data streams and clock data as will be appreciated by those of skill in the art. Communication links or interfaces 49 allow interface 45 to communicate with receptacles 43 thereby interfacing the high speed digital data and clock loop interfaces to receptacles 43 and the information stored on smart cards 41 therein thereby linking the selected encrypted scrambled data with the corresponding smart card 41 for decrypting and/or descrambling.

After descrambling and decryption, output 51 (descrambled and decrypted) of block 7 is forwarded to conventional MPEG 2 decompression block 15. MPEG 2 decompression station 15 is shown in more detail in FIG. 6. Block 15 includes conventional MPEG 2 circuits 53, video RAM 55, audio RAM 57, MPEG audio unit 59, and MPEG video unit 61, all of which are conventional in nature. Output 63 of MPEG 2 circuits 53 is forwarded as a wideband data output while outputs 65 and 67 of MPEG video and MPEG audio respectively are forwarded to video and audio modulators 17 (see FIG. 7) so that the decompressed signals may be further processed for viewing.

Video and audio modulator block 17 is shown in detail in FIG. 7. This block includes audio digital to analog converter 69, NTSC video modulators 71, and phase alternation line (PAL) block 73. The outputs of digital to analog converter 69, NTSC (National Television Systems Committee) video modulators 71, and PAL 73 are forwarded to the viewer's television set or display for viewing by the viewer/user.

Referring now to FIGS. 5(a) and 5(b), top and side elevational views of a smart card 41 respectively, it may be seen that each removable smart card 41 is substantially planar in nature and includes area 75 for electronics and area 77 for connectors. A conventional PCMCIA or ISO 7816, for example, may be located in area 77 for communicating with interface 45 by way of receptacle 43 and communication link/interface 49. The electronics area 75 on each card 41 may be formed in a known manner so as to include the required decryption algorithm circuitry.

FIG. 8 is a block diagram of controller 9. As shown, controller 9 includes a typical microprocessor 81, RAM 83, EPROM 85, EEPROM 87, and interface system 89 for allowing the memories to communicate with microprocessor 81. Microprocessor 81 is in communication with bus 27 so that controller 9 may communicate with input signal interface 3, block 5, descrambler and decrypter 7, MPEG 2 decompressor 15, control and status block 13, and communications block 11. Input signal switching in interface 3 by way of switch 25 is accomplished by use of control signals originating from controller 9 according to certain embodiments. When the user at control and status station 13 desires to view a particular channel, controller 9 outputs data to interface 3 in order to instruct interface 3 and switch 25 therein to select the particular signal/satellite for viewing and subsequent forwarding to block 5 and block 7. Each of the memories and microprocessor in controller 9 as shown in FIG. 8 are conventional in nature and may be purchased commercially (or may be implemented using software).

FIG. 9 is a block diagram of communications block 11 which includes modem 93 (conventional in nature) and UART 95, also conventional in nature. Modem 93 and UART 95 are in communication with bus 27 as well as outside communications channels and devices by way of outputs 97. Communications block 11 by way of modem 93 and UART 95 permit the set top box of this invention to communicate with other electrical components outside of the system such as phone lines, etc., by way of outputs 97. Communications block 11 optionally may be used to receive remote control signals from the user.

FIG. 10 is a side elevational schematic view of control and status unit 13 and bus 27. Control and status unit 13 includes a conventional box housing and including front panel controllers 99, front panel status indicator (liquid crystal display, for example) 101, and remote control IR or RF receiver 103. Remote control 105 is used to instruct the set top box system by way of wireless link 107 of instructions from the user. By way of remote control 105, the user may select particular satellites and then channels for viewing. Remote control 105 may be of the infrared (IR) or radio frequency (RF) wireless type. Display 101 may indicate, for example, which channel is being currently viewed by the viewer and from which satellite. Front panel controllers or control switches 99 are provided so as to allow the user to manually select different channels or satellites instead of using remote control 105 as discussed above.

Figure 11:
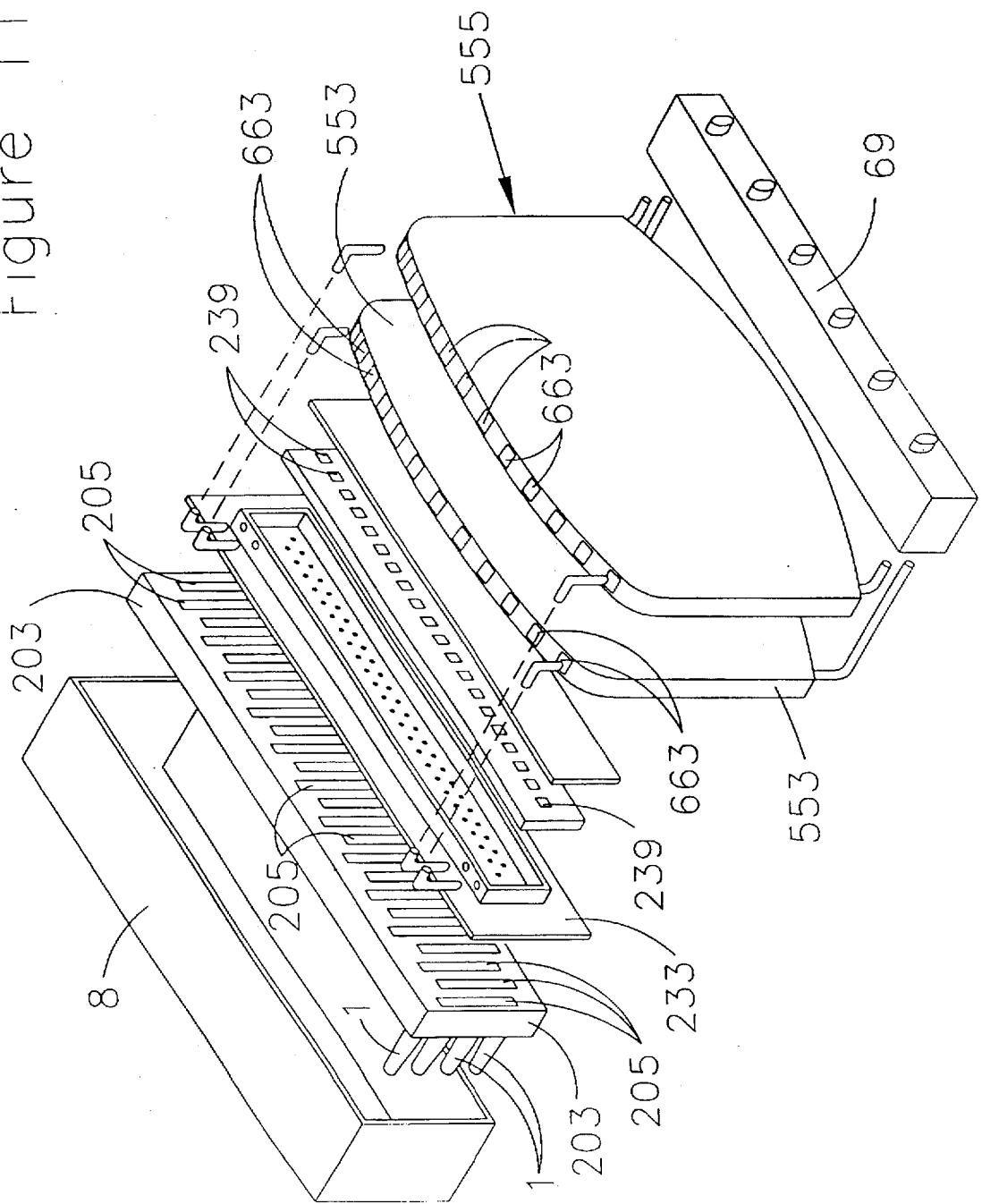
Figure 12:
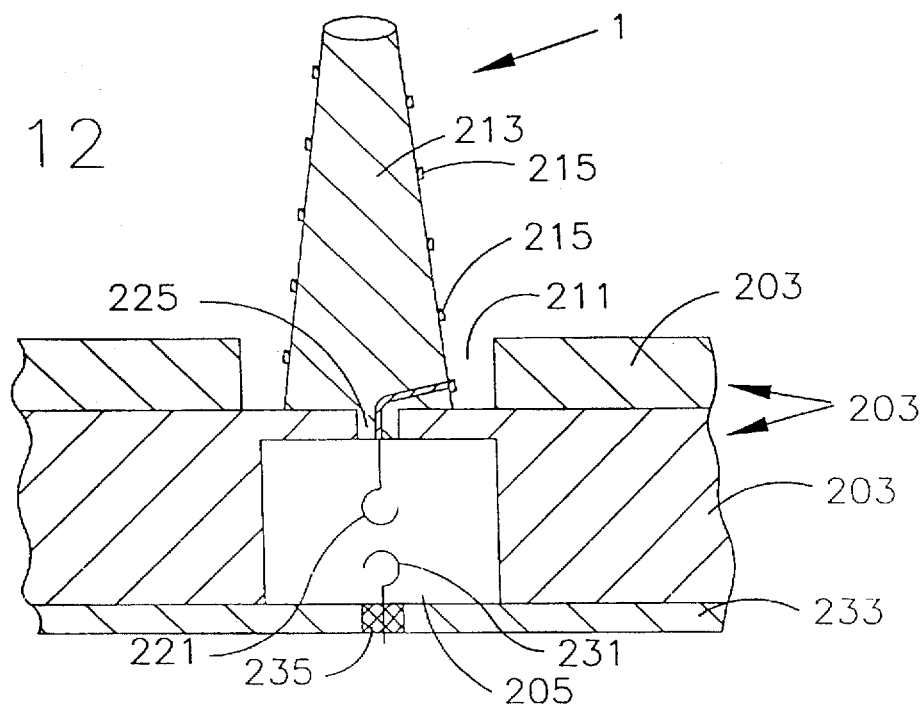
Figure 13:
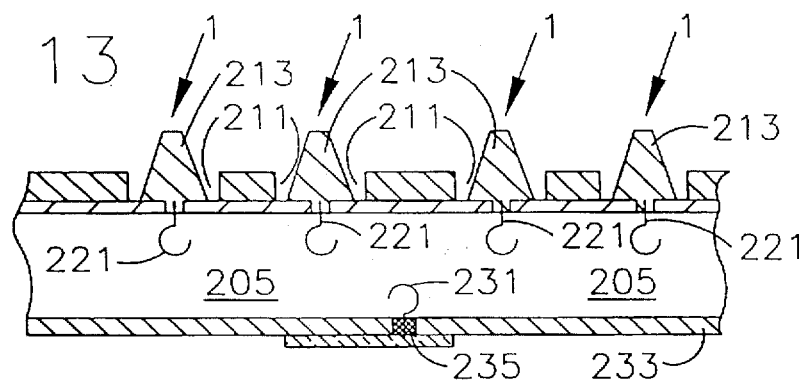
Figure 14:
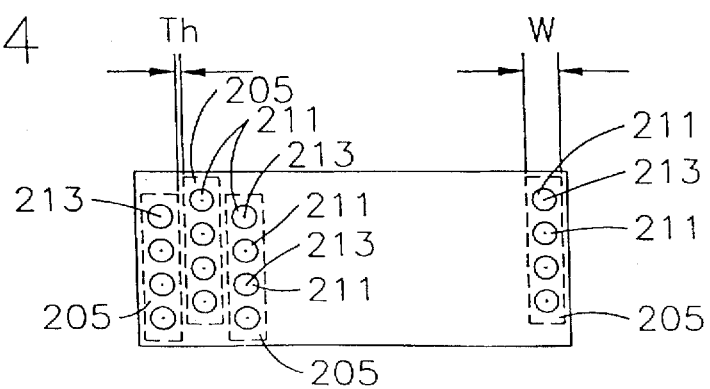
Figure 15:
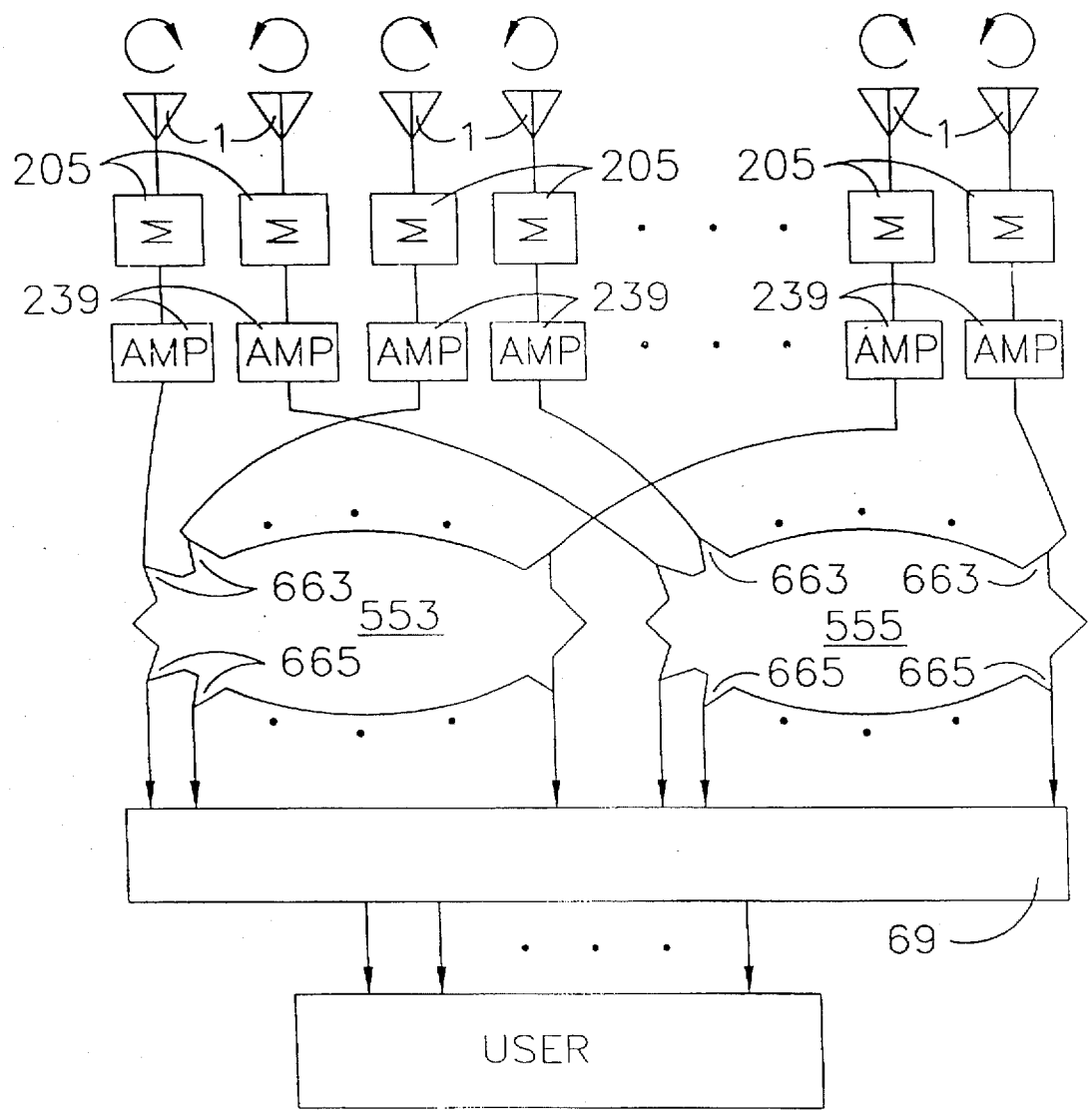

FIG. 11 is a perspective exploded view of a multibeam array antenna for simultaneously receiving signals (RH, LH, and linear for example) from different satellites. The multibeam array antenna shown in FIG. 11 is more fully described in U.S. Ser. No. 08/299,376, the disclosure of which is incorporated herein by reference. This array antenna system or a plurality of parabolic antennas (see FIG. 2) may make up antenna system 21 which is in communication with the set top box of this invention.

Once given the above disclosure, therefore, various other modifications, features, or improvements will become apparent to the skilled artisan. Such other features, modifications, and improvements are thus considered a part of this invention. The scope of which is to be determined by the following claims.

I claim:

1. A home satellite television receiving system for receiving and decrypting signals transmitted from a plurality of different satellites, the system comprising:

an antenna system for simultaneously receiving first and second encrypted television signals from first and second satellites respectively, said first and second signals having different types of encryption whereby said first signal has a first encryption and said second signal has a second encryption;

a switch for allowing a user or viewer to select one of said first and second signals for viewing;

a decrypting device simultaneously housing first and second removable smart cards, said first smart card including a memory for storing a first decrypting algorithm for decrypting said received first signal having said first encryption, and said second smart card including a second decrypting algorithm for decrypting said received second signal having said second encryption whereby the signal selected for viewing by the user or viewer, whether said first signal or said second signal, is decrypted using the appropriate smart card and thereafter forwarded for viewing.

2. The system of claim 1, further comprising an input signal interface for receiving said first and second encrypted signals from said antenna system and outputting the selected signal to said decrypting device, said input signal interface including said switch.

3. The system of claim 2, further comprising means for RF tuning, demodulating, and forward error correcting (FEC) disposed between said input signal interface and said decrypting device, said means for RF tuning, demodulating and FEC forwarding the selected signal to said decrypting device in the form of a digital data stream.

4. The system of claim 3, further comprising means for decompressing the decrypted selected television signal and subsequently forwarding the decompressed signal to a video output for viewing; and wherein said first and second cards store first and second decryption keys respectively.

5. The system of claim 4, further comprising a controller in communication with said input signal interface, said decrypting device, said means for RF tuning, demodulating, and FEC, and said means for decompressing, said controller for operating said switch thereby allowing the user to select a signal and satellite for viewing.

6. The system of claim 1, wherein said first and second encrypted signals are direct broadcast satellite (DBS) signals.

7. The system of claim 1, further comprising a third smart card having a third decrypting algorithm removably receivable in said decrypting device so that when said antenna system simultaneously receives three differently encrypted television signals, the viewer or user can select any one of the three for decrypting and viewing.

8. The system of claim 1, wherein said antenna system includes a multibeam array antenna which simultaneously receives and forwards said first and second signals which are at substantially the same frequency, the first signal being right-handed polarized and the second signal being left-handed polarized.

9. The system of claim 1, wherein said antenna system comprises first and second parabolic or dish antennas for receiving said first and second signals respectively.

10. A method of receiving a plurality of satellite signals and selecting one of the plurality, the method comprising the steps of:

simultaneously receiving first and second differently encrypted signals from first and second satellites respectively;

selecting one of the first and second signals;

selecting one of first and second removable simultaneously accessible decryption cards for decrypting the selected satellite signal, the first and second decryption cards having first and second different decrypting algorithms corresponding to the first and second received signals respectively;

decrypting and descrambling the selected signal using the selected decryption card; and using the decrypted and descrambled signal.

11. The method of claim 10, wherein the signals are video signals, and the method further comprising the step of decompressing the decrypted and descrambled selected signal before viewing.

12. The method of claim 11, further comprising the steps of forward error correcting and demodulating the selected signal before it is decrypted and descrambled.

13. The method of claim 12, further comprising the step of providing a multibeam array antenna for simultaneously receiving the first and second signals.

14. The method of claim 10, further comprising the step of storing first and second decryption keys in said first and second cards respectively.

* * * * *